Figure 1:
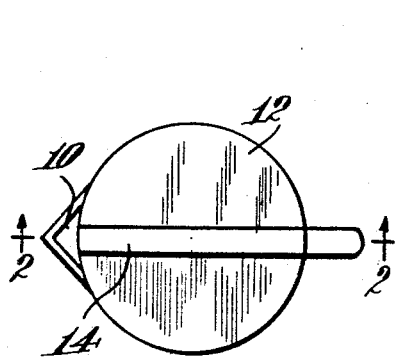

Aug. 1, 1967   D. D. GOSS   3,333,738
PITCHER FOR RECONSTITUTING BEVERAGE CONCENTRATES
Filed June 7, 1966

Inventor
Donald D. Goss
by Roberts, Cushman & Grover
Att'ys

United States Patent Office 3,333,738
Patented Aug. 1, 1967

3,333,738
PITCHER FOR RECONSTITUTING BEVERAGE CONCENTRATES
Donald D. Goss, Marblehead, Mass., assignor to H. P. Hood & Sons, Inc., Boston, Mass., a corporation of Massachusetts
Filed June 7, 1966, Ser. No. 555,846
6 Claims. (Cl. 222—129)

The present invention relates to beverage containers, and more particularly to a container or pitcher which can be used for reconstituting beverage concentrates with fluid such as water and for storing and serving the reconstituted mixture.

Beverage concentrates are commonly sold for home use. Frozen orange and grapefruit juice concentrates in particular, and many other concentrates as well, enjoy great popularity with consumers. However, this popularity is limited to some extent by the difficulty and inconvenience of reconstitution. The present practice involves the somewhat messy and time-consuming procedure of opening the concentrate can, removing the frozen contents and placing them in a container, measuring the required fluid and placing it in the container, and then shaking or stirring the concentrate and fluid until they are mixed.

Objects of the present invention are to provide a pitcher which substantially simplifies the reconstituting of beverage concentrates; which permits easy and fast reconstituting without mess; which permits reconstituting to take place in a clean and sanitary manner, which is useable not only for mixing, but also for storing and serving the mixture; which can be inexpensively produced by molding; and which can be produced with attractive appearance.

The container according to the invention is a reuseable pitcher for reconstituting beverage concentrates with fluid and for storing and serving the reconstituted mixture, comprising a receptacle of capacity sufficient to hold said beverage in reconstituted volume, said receptacle having a top opening for receiving reconstituting fluid and receiving means adjacent the bottom of said receptacle for receiving and holding in leak-tight relation a container of concentrate, said means providing liquid communication between said receptacle and the top of said container, and closure means for selectively opening and closing the top opening in said receptacle. Preferably, the receiving means comprises a wall defining a tapered recess of a depth to receive the container of beverage concentrate and includes means gripping the top periphery of the concentrate container in liquid-tight communication with the interior of said receptacle. Most preferably, the recess has in interiorly directed peripheral groove at or adjacent its inner end to receive the upper rolled edge or the like of a container of beverage concentrate. The closure means is preferably a rotatable cover having a cylindrical depending baffle within a circumferential gap therein alignable by rotation with the receptacle pouring spout and includes a handle, preferably elongate, so aligned with the gap as to indicate, by its position, the position of the gap relative to the pouring spout.

Figure 4:
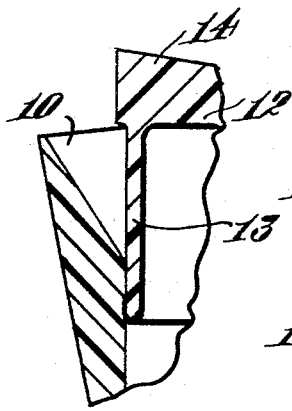
Figure 3:
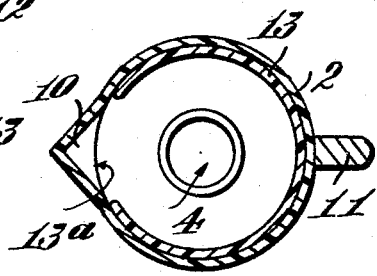
Figure 2:
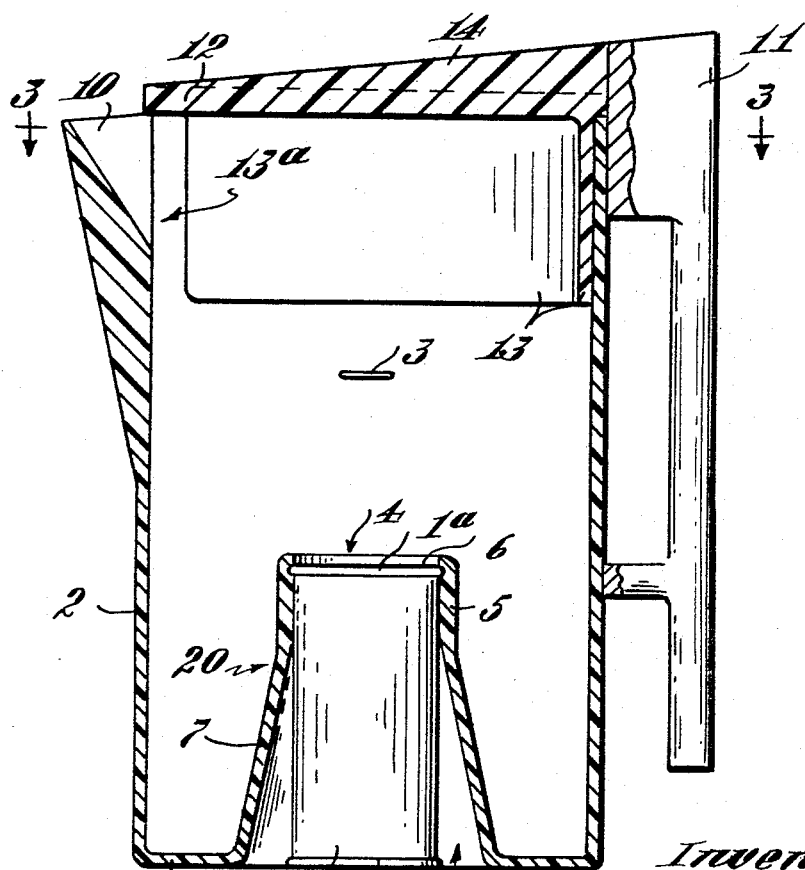

For the purpose of illustration a typical embodiment of the invention is shown in the accompanying drawing in which:

FIG. 1 is a top view of the container;
FIG. 2 is a section, to enlarged scale, on line 2—2 of FIG. 1;
FIG. 3 is a section on line 3—3 of FIG. 2; and
FIG. 4 is a partial section similar to FIG. 2 showing the lid in an alternative position.

In the particular embodiment of the invention chosen for the purpose of illustration, the pitcher is shown designed for use with a typical frozen concentrate can 1 (FIG. 2), of orange juice or the like which has been opened at its upper end. Can 1 is of the common type having rolled ends 1a and 1b.

The pitcher comprises a receptacle 2 of a volume at least sufficient to hold fluid to reconstitute one can of concentrate. A mark 3 may be provided on the inside of the receptacle to indicate the required quantity of fluid, for example, water. The receptacle has an open top, a spout 10 and receiving means adjacent the bottom for receiving and holding can 1 in leak-tight relation to the receptacle.

The receiving means adjacent the bottom comprises a wall 20 comprising generally conical portion 7, and a sleeve portion 5 terminating in an opening 4 communicating with the interior of receptacle 2. Wall 20 defines a tapered recess 8 of a depth sufficient fully to accommodate the concentrate can 1. Being tapered at its lower portion, recess 8 enables the can 1 to be readily gripped for ease in insertion and removal. Wall 20 also serves as a mixing member in the nature of a baffle to facilitate mixing of concentrate and diluting liquid.

Sleeve 5 terminates adjacent opening 4 in an interiorly directed peripheral groove 6 adapted to receive rolled edge 1a of can 1, holding the can in liquid tight relation and, with the top of the can removed, in liquid communication with the interior of receptacle 2.

Near the top, receptacle 2 has formed therein a pouring spout 10 and opposite the pouring spout, a handle 11 is affixed to the receptacle. A removable cover 12 interfits with the receptacle at its open top. To form a seal with the receptacle and thereby enable the pitcher to be shaken without leakage of its contents, the lid 12 is provided with a cylindrical depending baffle 13 which, as shown in FIG. 4, extends below the pouring spout 10. Baffle 13 is provided with a circumferential gap 13a which, by rotation of the cover, is moved out of alignment to seal the spout with baffle 13 (FIG. 4).

On the top of the lid 12 there is formed a raised elongate handle 14 which is substantially wedge-shaped. The member 14 has its lower end situated above the gap in the depending portion 13, and thus the member 14 serves also as a visual indicator for the position of gap 13a relative to spout 10. To further aid in showing the condition of the pouring spout, the handle 11 may be extended so that its top forms a continuation of the wedge-shaped member 14 as shown in FIGS. 1 and 2.

The pitcher is used as follows. The concentrate can 1 is opened and the opened end is inserted into the recess 8 until the rim of the can snaps into groove 6. The receptacle is filled with fluid to the mark 3. The lid 12 is placed on the receptacle and rotated by the handle 14 until the upper end of the member 14 is adjacent the pouring spout 10 and the lower end is adjacent the handle 11. The pitcher is shaken until the concentrate and fluid are mixed, the wall 20 helping to break up pieces of the concentrate. Using handle 14, the lid 12 is then rotated until the lower end of the member 14 is adjacent the pouring spout 10. The reconstituted mixture may then be served, holding the pitcher by handle 11 and pouring though the open pouring spout 10.

It should be noted that the pitcher as described can be very easily and inexpensively manufactured of plastic by molding. While it can be made of any suitable material, a somewhat resilient plastic is preferred to facilitate sealing and ease in inserting and removing concentrate cans. While a pouring spout 10 of generally conventional shape is described above, any other suitable pouring arrangement with no spout, a notch, or the like can also be employed. Groove 6 can also be shaped, if desired, to receive a threaded concentrate container.

It should be understood that the foregoing description

I claim:

1. A reuseable pitcher for mixing, storing and serving beverages available in concentrate form, said pitcher comprising
   (a) a receptacle of capacity sufficient to hold said beverage in reconstituted volume, said receptacle having a top opening for receiving reconstituting fluid and receiving means adjacent the bottom of said receptacle for receiving and holding in leak-tight relation a container of concentrate, said means providing liquid communication between said receptacle and the top of said container, and
   (b) closure means for selectively opening and closing the top opening in said receptacle.

2. A pitcher according to claim 1, wherein said receiving means comprises a wall defining a tapered recess of a depth sufficient to receive said container within said receptacle.

3. A pitcher according to claim 2, wherein said receiving means also includes means gripping the top periphery of said concentrate container in liquid tight communication with the interior of said receptacle.

4. A pitcher according to claim 2, wherein said receptacle further includes a pouring spout and said closure means includes a depending baffle with a gap therein, said top being rotatable to bring said gap into and out of alignment with said pouring spout to open and close the top of said receptacle.

5. A pitcher according to claim 4, wherein said closure means further comprises exterior means for indicating the position of said baffle gap in relation to said spout.

6. A pitcher according to claim 3 for use with a concentrate container having an outstanding bead adjacent one end, wherein said gripping means comprises a circumferential groove formed on the inside surface of the wall defining said tapered recess adjacent the inner extremity thereof for receiving and tightly gripping the bead on the concentrate container in liquid-tight relation.

References Cited

UNITED STATES PATENTS

| | | | |
|---|---|---|---|
| 2,260,875 | 10/1941 | Vranichar | 141—319 X |
| 2,714,974 | 8/1955 | Sawyer. | |
| 2,774,393 | 12/1956 | Swan | 222—129 X |
| 2,981,435 | 4/1961 | McCarthy. | |

ROBERT B. REEVES, *Primary Examiner.*

F. R. HANDREN, *Assistant Examiner.*